US 10,697,314 B2

(12) United States Patent
Thomas et al.

(10) Patent No.: US 10,697,314 B2
(45) Date of Patent: Jun. 30, 2020

(54) TURBINE SHROUD WITH I-BEAM CONSTRUCTION

(71) Applicant: Rolls-Royce Corporation, Indianapolis, IN (US)

(72) Inventors: David J. Thomas, Brownsburg, IN (US); Jeffrey A. Walston, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 217 days.

(21) Appl. No.: 15/294,177

(22) Filed: Oct. 14, 2016

(65) Prior Publication Data
US 2018/0106160 A1     Apr. 19, 2018

(51) Int. Cl.
| F01D 11/08 | (2006.01) |
| F01D 25/24 | (2006.01) |
| F01D 25/00 | (2006.01) |
| F01D 11/14 | (2006.01) |

(52) U.S. Cl.
CPC ............ *F01D 11/08* (2013.01); *F01D 25/005* (2013.01); *F01D 25/24* (2013.01); *F01D 25/246* (2013.01); *F01D 11/14* (2013.01); *F05D 2220/32* (2013.01); *F05D 2240/11* (2013.01); *F05D 2250/75* (2013.01); *F05D 2300/6033* (2013.01); *Y02T 50/672* (2013.01)

(58) Field of Classification Search
CPC ........ F01D 11/08; F01D 25/246; F01D 25/24; F01D 25/005; F01D 11/14; F05D 2300/6033; F05D 2250/75; F05D 2240/11
See application file for complete search history.

(56) References Cited

U.S. PATENT DOCUMENTS

| 2,834,537 A | 5/1958 | Neary |
| 2,925,290 A | 2/1960 | Greenwald |
| 4,841,726 A | 6/1989 | Burkhardt |
| 4,875,828 A | 10/1989 | Willkop et al. |
| 4,934,900 A | 6/1990 | Schonbach et al. |
| 5,141,395 A | 8/1992 | Carroll et al. |
| 5,143,384 A | 10/1992 | Lipschitz |
| 5,169,287 A | 12/1992 | Proctor et al. |
| 5,180,281 A | 1/1993 | Burge et al. |

(Continued)

FOREIGN PATENT DOCUMENTS

| EP | 171329 A1 | 2/1986 |
| EP | 1350927 A2 | 10/2003 |

(Continued)

OTHER PUBLICATIONS

Extended EP Search Report dated Feb. 19, 2018 and issued in connection with European Patent Appln. No. 17194914.2.

(Continued)

*Primary Examiner* — Kenneth Bomberg
*Assistant Examiner* — Hakeem M Abdellaoui
(74) *Attorney, Agent, or Firm* — Barnes & Thornburg LLP

(57) ABSTRACT

A turbine shroud assembly of a gas turbine engine for combustion of fuel mixed with air to produce exhaust products includes a blade track having an I-beam construction including ceramic materials and defining a flow surface to guide exhaust products through a turbine section of the gas turbine engine to expand the exhaust products across the turbine section to produce force.

15 Claims, 2 Drawing Sheets

(56) References Cited

U.S. PATENT DOCUMENTS

| | | |
|---|---|---|
| 5,272,869 A | 12/1993 | Dawson et al. |
| 5,288,206 A | 2/1994 | Bromann et al. |
| 5,320,486 A | 6/1994 | Walker et al. |
| 5,522,705 A | 6/1996 | Elaini et al. |
| 5,971,703 A | 10/1999 | Bouchard |
| 6,155,572 A | 12/2000 | Wu |
| 6,244,599 B1 | 1/2001 | Braun |
| 6,382,905 B1 | 5/2002 | Czachor et al. |
| 6,543,995 B1 | 4/2003 | Honda et al. |
| 6,575,697 B1 | 6/2003 | Arilla et al. |
| 6,602,050 B1 | 8/2003 | Scheurlen et al. |
| 6,655,696 B1 | 12/2003 | Fang et al. |
| 6,733,235 B2 | 5/2004 | Alford et al. |
| 6,884,026 B2 | 4/2005 | Glynn et al. |
| 6,969,236 B2 | 11/2005 | Giesler et al. |
| 7,001,493 B1 | 2/2006 | Kim |
| 7,052,235 B2 | 5/2006 | Alford et al. |
| 7,066,470 B2 | 6/2006 | Turnquist et al. |
| 7,094,029 B2 | 8/2006 | Taylor et al. |
| 7,114,920 B2 | 10/2006 | Synnott |
| 7,229,246 B2 | 6/2007 | Ghasripoor et al. |
| 7,494,317 B2 | 2/2009 | Keller et al. |
| 7,614,848 B2 | 11/2009 | Bogue et al. |
| 8,047,779 B2 | 11/2011 | Roy et al. |
| 8,133,013 B2 | 3/2012 | Audeon et al. |
| 8,215,645 B1 | 7/2012 | Aho, Jr. |
| 8,303,246 B2 | 11/2012 | Drelon et al. |
| 8,430,629 B2 | 4/2013 | Turi et al. |
| 8,454,023 B2 | 6/2013 | Samudrala et al. |
| 8,973,375 B2 | 3/2015 | O'Leary |
| 9,039,358 B2 | 5/2015 | Tholen et al. |
| 9,080,463 B2 | 7/2015 | Denece et al. |
| 9,127,569 B2 | 9/2015 | Akiyama et al. |
| 9,726,043 B2 | 8/2017 | Franks et al. |
| 9,759,082 B2 | 9/2017 | Thomas et al. |
| 9,845,692 B2 | 12/2017 | Jamison |
| 9,915,153 B2 | 3/2018 | Sener |
| 9,938,846 B2 | 4/2018 | Freeman et al. |
| 10,041,369 B2 | 8/2018 | Blaney et al. |
| 10,054,232 B2 | 8/2018 | Seaton |
| 10,100,649 B2 | 10/2018 | Thomas |
| 10,138,746 B2 | 11/2018 | McMahon |
| 10,184,356 B2 | 1/2019 | McCaffrey |
| 10,208,614 B2 | 2/2019 | Hafner et al. |
| 10,215,056 B2 | 2/2019 | Sippel et al. |
| 2004/0188947 A1 | 9/2004 | Paprotna |
| 2008/0178465 A1 | 7/2008 | Schiavo et al. |
| 2009/0110546 A1 | 4/2009 | Tholen et al. |
| 2011/0219775 A1* | 9/2011 | Jarmon .............. C04B 35/573 60/753 |
| 2012/0248704 A1 | 10/2012 | Fennell et al. |
| 2013/0052030 A1* | 2/2013 | McCaffrey .............. B29C 70/00 416/241 B |
| 2014/0127457 A1 | 5/2014 | Hillier |
| 2014/0271145 A1 | 9/2014 | Thomas et al. |
| 2016/0169038 A1 | 6/2016 | Weaver et al. |
| 2016/0186999 A1 | 6/2016 | Freeman et al. |
| 2016/0215645 A1* | 7/2016 | McCaffrey .............. F01D 25/246 |
| 2016/0290145 A1 | 10/2016 | Roussille et al. |
| 2016/0333715 A1 | 11/2016 | McCaffrey |
| 2017/0130600 A1* | 5/2017 | Shapiro .................. F01D 11/08 |
| 2017/0260869 A1 | 9/2017 | Vetters et al. |
| 2017/0350268 A1* | 12/2017 | McCaffrey .............. F01D 11/08 |
| 2018/0106160 A1 | 4/2018 | Thomas et al. |
| 2018/0149030 A1 | 5/2018 | Freeman et al. |
| 2018/0149041 A1 | 5/2018 | Freeman et al. |
| 2018/0149042 A1 | 5/2018 | Freeman et al. |
| 2018/0156068 A1 | 6/2018 | Roussille et al. |
| 2018/0328208 A1 | 11/2018 | O'Leary et al. |
| 2018/0340440 A1* | 11/2018 | Freeman ................. F01D 11/08 |

FOREIGN PATENT DOCUMENTS

| | | |
|---|---|---|
| EP | 1965030 A2 | 9/2008 |
| EP | 2562360 A2 | 2/2013 |
| EP | 2728125 A1 | 5/2014 |
| EP | 3037628 A1 | 6/2016 |
| EP | 3075965 A1 | 10/2016 |
| JP | 2015161222 A | 9/2015 |
| WO | 1999031414 A1 | 6/1999 |
| WO | 2014186099 A1 | 11/2014 |
| WO | 2015191185 A1 | 12/2015 |
| WO | 2018172655 A1 | 9/2018 |

OTHER PUBLICATIONS

European Office Action corresponding to 17 194 914.2, dated Jan. 28, 2019.

* cited by examiner

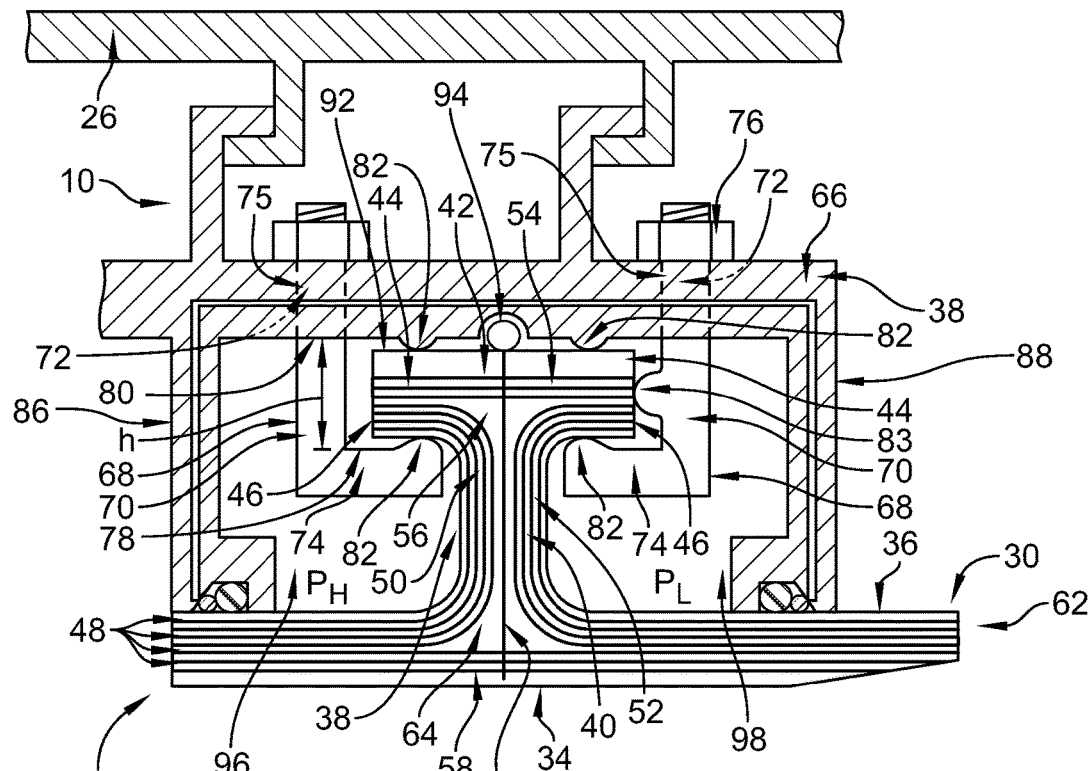
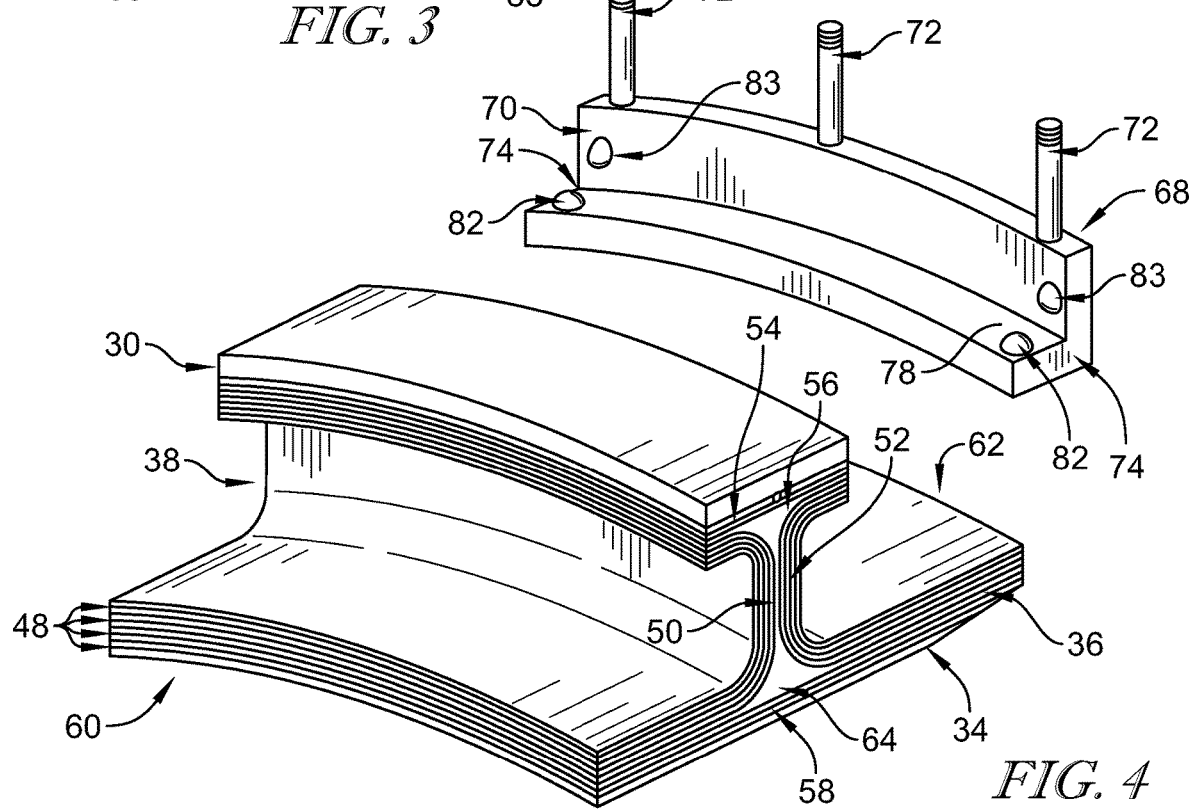
FIG. 3
FIG. 4

TURBINE SHROUD WITH I-BEAM CONSTRUCTION

FIELD OF THE DISCLOSURE

The present disclosure relates generally to shroud assemblies, and more specifically to shroud assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. In some applications, shroud assemblies define flow paths to assist in guiding exhaust products through the turbine.

SUMMARY

The present disclosure may comprise one or more of the following features and combinations thereof.

According to the present disclosure, a turbine shroud assembly may include a carrier arranged around at least a portion of central axis and forming a load stage, the carrier comprising metallic materials and including a forward hanger and an aft hanger, and a blade track comprising ceramic-containing materials, the blade track including a runner that extends at least partway about the central axis having a flow surface arranged to define a gas flow path and an attachment flange extending from the runner radially outward for engagement with the load stage of the carrier. The blade track may have an I-beam cross-sectional shape when viewed in the circumferential direction.

In some embodiments, the attachment flange may include a stalk attached to the runner and a pair of branches each connected with the stalk and extending in opposite directions to each form a free end.

In some embodiments, the branches may each extend from the stalk generally parallel to the central axis. In some embodiments, the blade track may be formed of at least one of a number of laminate layers and a three-dimensional interlock. In some embodiments, the branches may each be formed through a laminated construction of at least one of 1-dimensional lamina and 2-dimensional lamina.

In some embodiments, the blade track may be formed of a number of laminate layers including a first set of layers forming a portion of the stalk and a portion of one of the pair of branches, and a second set of layers forming another portion of the stalk and a portion of the other of the pair of branches.

In some embodiments, the number of laminate layers may include a third set of layers forming portions of each of the pair of branches. In some embodiments, a fill region may be formed at an intersection of each of the first, second, and third set of layers.

In some embodiments, the carrier may include a number of hangers extending radially inward therefrom and forming the load stage for supporting the blade track. In some embodiments, each of the number of hangers may include a body and a number of extension arms extending radially from the body for connection with the carrier.

In some embodiments, the body of each of the number of hangers may form the load stage to include at least one datum for engagement with the blade track.

In some embodiments, the attachment flange may extend radially outward from the runner and forms a seal between a high pressure region and a low pressure region.

According to another aspect of the present disclosure, a turbine shroud assembly may include a casing extending between forward and aft ends along a central axis, a carrier supported by the casing to provide a load stage, and a blade track comprising ceramic-containing materials defining an I-beam in cross-section taken along the central axis, the blade track segment including a runner having a flow surface arranged to define a gas flow path and an attachment flange extending from the runner radially outward for engagement with the carrier to form a seal.

In some embodiments, the attachment flange may include a stalk and a pair of branches each connected with the stalk and extending therefrom in opposite directions to a free end. In some embodiments, the blade track may be formed of a number of laminate layers including a first set of layers forming a portion of the stalk and a portion of one of the pair of branches, and a second set of layers forming another portion of the stalk and a portion of the other of the pair of branches.

In some embodiments, the blade track may include a third set of layers forming portions of each of the pair of branches.

In some embodiments, the carrier may include a number of hangers extending radially inward therefrom and forming the load stage for supporting the blade track. In some embodiments, each of the number of hangers may include a body and a number of extension arms extending radially from the body for connection with the carrier.

In some embodiments, the body of each of the number of hangers may form the load stage to include at least one datum for engagement with the blade track.

In some embodiments, the carrier may include at least one seal wall extending radially inward for engagement with the runner of the blade track. In some embodiments, the seal may form a pressure boundary establishing a high pressure one side and a low pressure on the other side.

These and other features of the present disclosure will become more apparent from the following description of the illustrative embodiments.

BRIEF DESCRIPTION OF THE DRAWINGS

FIG. 3 is a closer elevation view of a portion of the gas turbine engine of FIG. 3 showing that the attachment flange of the blade track includes a stalk extending radially (upward) from the runner and a pair of branches that extend from the stalk in opposite directions from each other for engagement with the load stage of the carrier to support the blade track with in the carrier, and showing that the blade track is formed of a number of layers including two distinct sets of layers (left, reverse C-shape; right, C-shape) respectively forming portions of the runner, stalk, and one of the branches, and another set of layers (upper horizontal layers) forming remaining portions of each of the branches, and showing that the attachment flange includes an upper end that engages the carrier to form a seal between a high pressure region and a low pressure region; and FIG. 4 is a perspective view of a portion of the blade track and one of the hangers of the carrier showing that the hangers each include a body, extension arms (three) extending radially outward (upwards) from the body for connection with the carrier, and an arm extending laterally from the body to form the load stage, and showing that the load stage includes data embodied as rounded contact points for engaging the attachment flange.

DETAILED DESCRIPTION OF THE DRAWINGS

Figure 1:
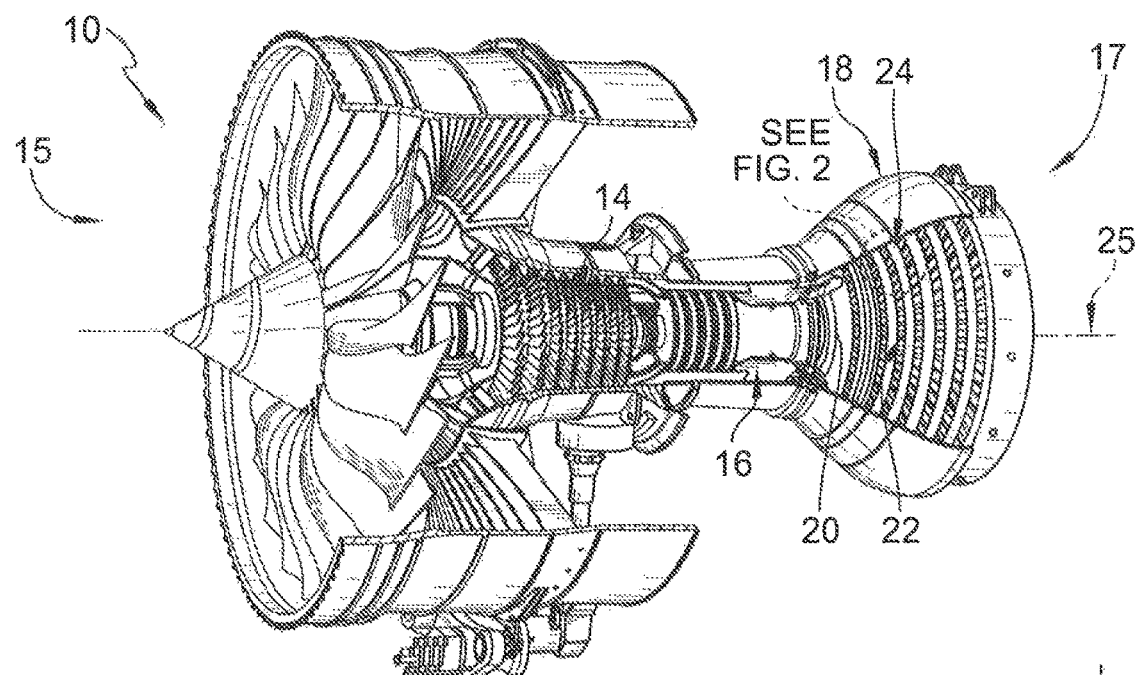
FIG. 1 is an perspective view of a gas turbine engine having a portion cut away to show that the gas turbine engine includes a fan, a compressor, a combustor, and a turbine section for expanding exhaust products from the combustion section, and showing that the turbine section includes a turbine rotor, blades, and a shroud assembly disposed about the rotor and blades to provide a flow surface to guide exhaust products from the combustor through the turbine section.

For the purposes of promoting an understanding of the principles of the disclosure, reference will now be made to a number of illustrative embodiments illustrated in the drawings and specific language will be used to describe the same.

An illustrative embodiment of a gas turbine engine 10 is shown in FIG. 1 having an forward end 15 and an aft end 17. The gas turbine engine 10 illustratively includes a fan 12 for drawing air into the engine 10, compressor 14 for compressing air received from the fan 12, a combustor 16 for receiving compressed air and mixing fuel with the compressed air and combusting the mixture to produce (exhaust) products of combustion, and a turbine section 18 for receiving and expanding the exhaust products therethrough to produce rotational force. The turbine section 18 illustratively includes a turbine rotor 20 and blades 22 extending radially from the turbine rotor 20 to receive and transfer the expansion forces from the exhaust products to drive rotation of the rotor 20 about the axis 25. A shroud assembly 24 is arranged within the turbine section 18 to guide the exhaust products therethrough.

Figure 2:
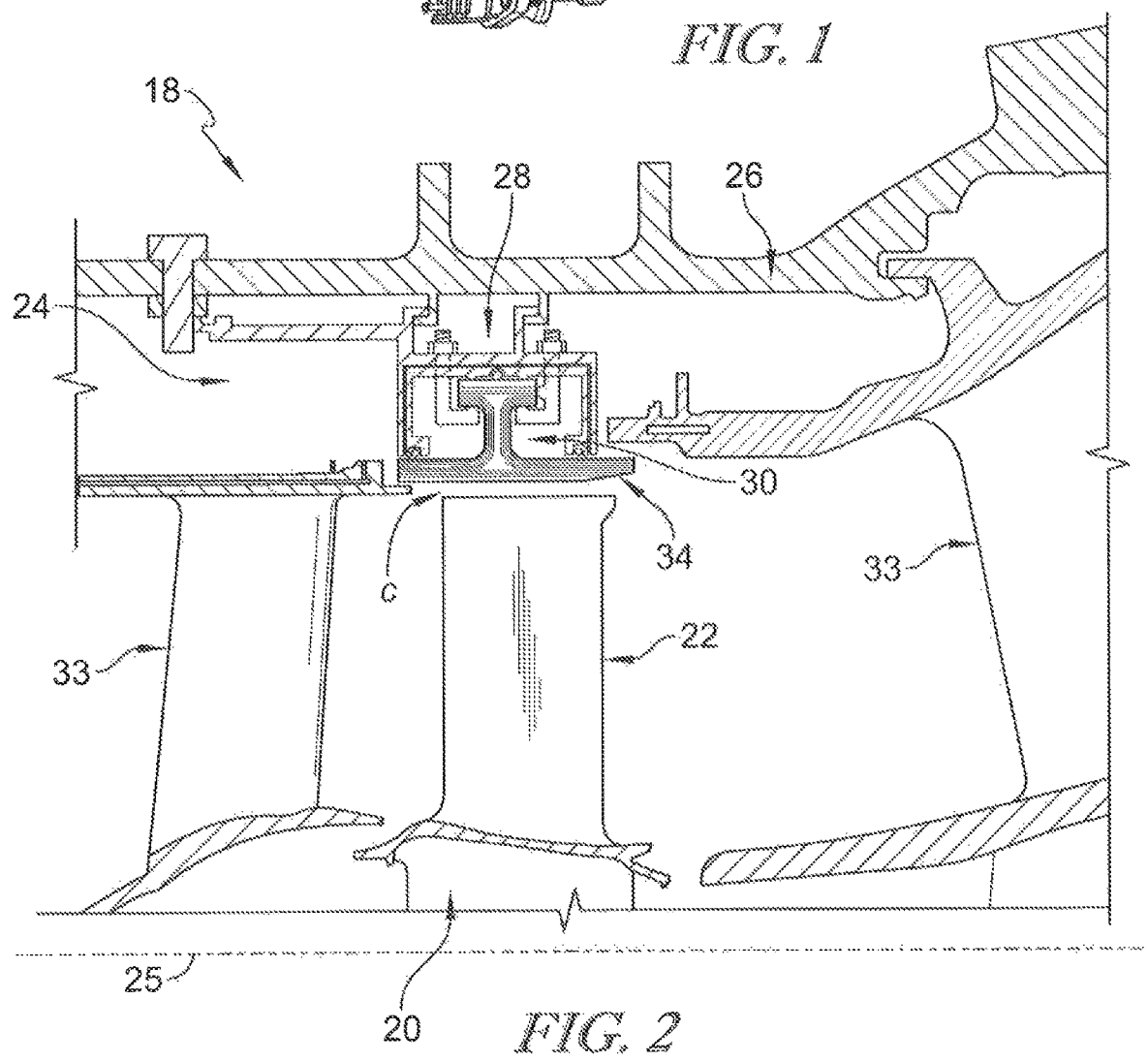
FIG. 2 is an elevation view of a portion of the gas turbine engine of FIG. 1 in cross-section along a central axis thereof showing that the shroud assembly includes an outer casing of the turbine section that extends about the central axis, a carrier supported by the outer casing and having hangers that extend inwardly to provide a load stage, and a blade track formed of ceramic matrix composite (CMC) materials including a runner that forms the flow surface (lower) for guiding exhaust products to engage the blades and an attachment flange for engagement with the load stage of the carrier.

As shown in the illustrative embodiment as shown in FIG. 2, the shroud assembly 24 illustratively includes an outer casing 26 of the turbine section 18 that extends about the axis 25. The shroud assembly 24 illustratively includes a carrier 28 supported by the outer casing 26 and a blade track 30 engaged with the carrier 28. The blade track 30 is arranged radially outward of the turbine blades 22 axially between guide vanes 33 of the turbine section 18. The blade track 30 illustratively forms a flow surface 34 facing radially inward to guide the exhaust products to engage the blades 22 through the turbine section 18.

As shown in FIG. 2, the flow surface 34 is illustratively disposed with a clearance c from the turbine blade 22. Maintaining specific clearances can increase the efficiency of the gas turbine engine 10, for example but without limitation, by increasing temperatures and pressures at the blades 22. Advanced materials capable of enduring the conditions for increased efficiency may be required. In the illustrative embodiment as shown in FIG. 2, the blade track 30 is formed to contain ceramic materials, and more specifically ceramic matrix composite materials.

Ceramic matrix composite (CMC) materials may illustratively include a ceramic matric material, for example but without limitation, silicon carbide (SiC) or silicon nitride ($Si_3N_4$); boron carbide ($B_4C$), zirconium diboride ($ZrB_2$), molybdenum carbide ($Mo_2C$), and/or the like, disposed about a reinforcement material. In some examples, the reinforcement material may include a continuous monofilament or multifilament weave. The reinforcement material may include SiC, $Si_3N_4$, or the like. The reinforcement material may include fibers, which may be coated with boron nitride, pyrolytic carbon, oxide interface coating, or the like. The ceramic matrix composite materials may be formed to include a two-dimensional (2D) laminate, a three-dimensional (3D) weave and/or braid ("interlock"), and/or any other suitable composite structure.

As shown in FIG. 3, the blade track 30 illustratively includes a runner 36 that forms the flow surface 32 and an attachment flange 38 that connects with the runner 36 and extends radially outward therefrom. The attachment flange 38 illustratively includes a stalk 40 that extends radially outward from connection with the runner 36 to an end 42 and branches 44 connected to the stalk 40 near the end 42. The branches 44 each illustratively extend from the stalk 40 in opposite directions from each other to each form a free end 46. In the illustrative embodiment, the branches 44 each generally extend from the stalk 40 parallel with the axis 25.

In the illustrative embodiment as shown in FIG. 3, the blade track 30 is formed of CMC materials in a laminate. The laminate of the blade track 30 illustratively includes layers 48 which provide the reinforcement material as mentioned above. The layer 48 are illustratively stacked up and treated with the matrix material to form the shape of the blade track 30 as a laminate. The blade track 30 illustratively includes layers 48 forming portions of each of the runner 36, the stalk 40, and the branches 44, but in some embodiments, the layer 48 may form portions of one or two of the runner 36, the stalk 40, and the branches 44.

As shown in FIG. 3, the layers 48 include a sets of layers 50, 52, 54. The set of layers 50 illustratively forms a portion of the stalk 40 and a portion of one (forward) of the branches 44. The set of layers 52 illustratively forms a stalk 40 and a portion of one (aft) of the branches 44. The set of layers 54 illustratively forms a portion of each of the branches 44 and extends between the free ends 46 near the end 42 of the attachment flange 38. A fill region 56 is illustratively defined at a convergence of the sets of layers 50, 52, 54 near the end 42. The fill region 56 is illustratively embodied as a space between different sets of layers 50, 52, 54 filled in with matrix material to strengthen the attachment flange 38.

In the illustrative embodiment as shown in FIGS. 3 and 4, the sets of layers 50, 52 each form a portion of the runner 36 and another set of layers 58 forms another portion of the runner 36 and extends between forward and aft ends 60, 62 of the runner 36. Another fill region 64 is defined near the connection of the runner 36 and the attachment flange 38. In the illustrative embodiment, the set of layers 50 is formed to have a reverse C-shape (in the orientation shown in FIGS. 3 and 4). The set of layers 52 is illustratively formed to have a C-shape (in the orientation shown in FIGS. 3 and 4). The attachment flange 38 of the blade track 30 engages the carrier 28 to support runner 36 of the blade track 30 within the outer casing 26. The collective arrangement of the layers 48 forming the runner 36 and attachment flange 38 define an I-beam construction of the blade track 30.

As shown in FIG. 3, the carrier 28 illustratively includes a frame 66 and hangers 68 extending radially inward to form the load stage. The hangers 68 are illustratively formed to have an L-shape. The hangers 68 are each illustratively embodied to include a body 70, extension arms 72 projecting from the body 70 for connection with the frame 66, and an arm 74 extending axially from the body 70 to define the load stage. The hangers 68 are each illustratively adjustably attached to the frame 66 by a fastener nut 76, embodied to include inner threads for engaging outer threads of the extension arms 72.

The extension arms 72 each illustratively extend through respective holes 75 of the frame 66 and each are adjustably suspended from the frame 66 by the respective fastener nut 76. A user can adjust each respective fastener nut 76 to define a height h that is embodied as a distance between a top surface 78 of the respective arm 74 (forming the load stage) and an inner surface 80 of the frame 66. The adjustable height h permits tuning of the contact points along the radial (and circumferential direction) between the carrier 28 and the blade track 30 to distribute loads precisely throughout the shroud assembly 24.

In the illustrative embodiment as shown in FIG. 4, the blade track 30 is formed of a number of circumferential segments, one segment of which is shown in exploded perspective with one of the hangers 68. The hangers 68 each illustratively include data 82 which form a portion of the load stage. Each datum 82 is illustratively embodied as a raised rounded section which forms a contact point to engage with the attachment flange 38 of the blade track 30. The data 82 illustratively provide a predictable location for load bearing engagement between components that define reference points for design and installation. Each blade track segment illustratively includes end seals 85 (best shown in FIG. 3) arranged on axial ends and engaged with adjacent segments, the end seals 85 being illustratively embodied as a strip seal, but in some embodiments may include any arrangement of seals between adjacent segments.

In the illustrative embodiment as shown in FIG. 4, the arm 74 of each hanger 68 includes a pair of data 82 that extend radially from the surface 78 generally at opposite circumferential ends. The body 70 of each hanger 68 includes another pair of data 83 extending therefrom generally perpendicular to the data 82 of the respective arm 74. In the illustrative embodiment, the arm 74 includes two data 82 and the body 70 includes two data 83, but in some embodiments, each hanger 68 may include any suitable number and/or arrangement of datum 82, 83 to provide at least a portion of the load stage for engagement with the blade track 30.

Returning to FIG. 3, the frame 66 of the carrier 28 illustratively includes outer wall 84 engaged with the outer casing 26 and forward and aft walls 86, 88 extending radially inward from the outer wall 84 to engage the blade track 30. The walls 86, 88 each illustratively include a seal 90 for sealing contact with the runner 36 of the blade track 30. The outer wall 84 engages with the attachment flange 38.

As shown in FIG. 3, the outer wall 84 of the carrier 28 illustratively includes data 82 projecting radially inward therefrom. The data 82 of the outer wall 84 illustratively engage the attachment flange 38 at an outer surface 92 thereof near the end 42 of the stalk 40. The outer wall 84 illustratively includes a seal member 94 sealingly engaged with the outer surface 92 of the attachment flange 38. The seal member 94 defines a pressure boundary between pressure cavities 96, 98.

As shown in FIG. 3, the pressure cavities 96, 98 are illustratively defined between by the carrier 28 and the blade track 30. The pressure cavity 96 is illustratively defined between the carrier 28 and blade track 30 forward of the attachment flange 38 and is formed to establish a pressure $P_H$. The pressure cavity 98 is illustratively defined between the carrier 28 and blade track 30 aftward of the attachment flange 38 and is formed to establish a pressure $P_L$ that is lower than $P_H$. The engagement of the attachment flange 38 with the carrier 28 at the seal member 94 defines a pressure boundary for establishing the pressures $P_H$, $P_L$. In the illustrative embodiment, The present disclosure includes devices, systems, and methods for supporting a blade track having an I-beam construction within a turbine section of a gas turbine engine. The I-beam construction provide structural support for the blade track that corresponds with the substructure of the materials, for example, CMC materials. Correspondence between the substructure and the support can increase performance and lifetime of the component.

CMC materials have desirable specific strength and high temperature capabilities for use in gas turbine engines. Integration of CMC materials together with metallic structures can present practical challenges, for example, for high pressure (HP) seal segments the thermal growth differences between metal and CMC materials. The present disclosure includes devices, systems, and methods for overcoming such issues. The I-beam design of the blade track component disclosed herein provides accommodating structure at interface locations to reduce thermal growth mismatch and direct stresses therefrom through the I-beam in correspondence with the I-beam substructure. This can reduce bending stresses (for example, over bird mouth design) in the flange connection and reduce in-plane and through thickness loading in fillets. Symmetrical bending of the I-beam construction resists deformation in a single direction and more efficiently translating the radial load into the primary in-plane loading in the I-beam web.

The present disclosure includes devices, systems, and methods for blade track construction which can reduce the number of seals and seal features, for example, seal grooves in the CMC and rope seal locations. Seal landing, for example, for rope seals can be increased in area. The present disclosure includes simplified design for manufacturing for both CMC materials and metal structures. Removal of the septum wall (divider) from the carrier can improve castability and/or reduce weight. The present disclosure includes reduction of trapped tooling during fabrication, easier lay-up, improved part yield, reduced tooling cost, and improved space claim requirements.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly comprising
   a carrier arranged around at least a portion of central axis and forming a load stage, the carrier comprising metallic materials and including a forward hanger and an aft hanger, and
   a blade track comprising ceramic-containing materials, the blade track including a runner that extends at least partway about the central axis having a flow surface arranged to define a gas flow path and an attachment flange extending from the runner radially outward for engagement with the load stage of the carrier, wherein the blade track has an I-beam cross-sectional shape when viewed in the circumferential direction, wherein the attachment flange includes a stalk attached to the runner and a pair of branches each connected with the stalk and extending in opposite directions to each form a free end, wherein the attachment flange is formed of a set of layers forming a portion of the stalk and a first portion of the one of the pair of branches, and another set of laminate layers forming another portion of the stalk and a first portion of the other of the pair of branches, wherein a further set of laminate layers forms at least a second portion of each of the pair of branches, and the laminate layers forming the first and second portions of the branches extend parallel with each other at the free end of each branch, wherein the attachment flange extends radially outward from the runner and is adapted to engage with a radially inner side of the carrier sealing between a high pressure region and a low pressure region.

2. The turbine shroud assembly of claim 1, wherein the set of laminate layers forming a portion of the stalk also form a portion of the runner.

3. The turbine shroud assembly of claim 2, wherein the branches each extend from the stalk generally parallel to the central axis.

4. The turbine shroud assembly of claim 2, wherein the blade track is formed of a three-dimensional interlock.

5. The turbine shroud assembly of claim 1, wherein a fill region is formed at an intersection of each of the stalk and the branches.

6. The turbine shroud assembly of claim 1, wherein the carrier includes a number of hangers extending radially inward therefrom and forming the load stage for supporting the blade track.

7. The turbine shroud assembly of claim 6, wherein each of the number of hangers includes a body and a number of extension arms extending radially from the body for connection with the carrier.

8. The turbine shroud assembly of claim 7, wherein the body of each of the number of hangers forms the load stage to include at least one datum for engagement with the blade track.

9. A turbine shroud assembly comprising
a casing extending between forward and aft ends along a central axis,
a carrier supported by the casing to provide a load stage, and
a blade track comprising ceramic-containing materials defining an I-beam in cross-section taken along the central axis, the blade track segment including a runner having a flow surface arranged to define a gas flow path and an attachment flange extending from the runner radially outward engaging on a radially outward end with a radially inner side of the carrier forming a seal between a high pressure region and a low pressure region, wherein the attachment flange includes a stalk and a pair of branches each connected with the stalk and extending therefrom in opposite directions to a free end, a set of laminate layers forming a portion of the stalk and a portion of one of the pair of branches and another set of laminate layers forming a portion of at least one of the branches, wherein the attachment flange is formed of a number of laminate layers including a set of layers forming a portion of the stalk and a first portion of the one of the pair of branches, and another set of layers forming another portion of the stalk and a first portion of the other of the pair of branches, wherein a further set of laminate layers forms at least a second portion of each of the pair of branches, and the laminate layers forming the first and second portions of the branches extend parallel with each other at the free end of each branch.

10. The turbine shroud assembly of claim 9, wherein at least one of the sets of laminate layers forming one of the portions of the stalk also forms a portion of the runner.

11. The turbine shroud assembly of claim 9, wherein the carrier includes a number of hangers extending radially inward therefrom and forming the load stage for supporting the blade track.

12. The turbine shroud assembly of claim 11, wherein each of the number of hangers includes a body and a number of extension arms extending radially from the body for connection with the carrier.

13. The turbine shroud assembly of claim 12, wherein the body of each of the number of hangers forms the load stage to include at least one datum for engagement with the blade track.

14. The turbine shroud assembly of claim 9, wherein the carrier includes at least one seal wall extending radially inward for engagement with the runner of the blade track.

15. The turbine shroud assembly of claim 9, wherein the seal forms a pressure boundary establishing a high pressure one side and a low pressure on the other side.

* * * * *